United States Patent
Burd et al.

(10) Patent No.: US 9,003,662 B2
(45) Date of Patent: Apr. 14, 2015

(54) INSERT AND METHOD FOR ANCHORING IN A CORED PANEL

(71) Applicant: B/E Aerospace, Inc., Wellington, FL (US)

(72) Inventors: Peter John Leslie Burd, Carmarthenshire (GB); Venkata Prasanth Suman Neti, Stevenage (GB)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 14/168,718

(22) Filed: Jan. 30, 2014

(65) Prior Publication Data

US 2014/0212241 A1     Jul. 31, 2014

Related U.S. Application Data

(60) Provisional application No. 61/758,910, filed on Jan. 31, 2013.

(51) Int. Cl.
*F16B 5/01* (2006.01)
*F16B 37/00* (2006.01)
*F16B 33/00* (2006.01)
*F16B 11/00* (2006.01)

(52) U.S. Cl.
CPC . *F16B 33/00* (2013.01); *F16B 5/01* (2013.01); *F16B 11/006* (2013.01)

(58) Field of Classification Search
USPC ............. 411/82, 82.1, 111; 52/787.1, 787.11, 52/787.12
See application file for complete search history.

(56) References Cited

U.S. PATENT DOCUMENTS

| | | | | |
|---|---|---|---|---|
| 3,252,493 A * | 5/1966 | Smith | ............................ | 411/108 |
| 3,282,015 A * | 11/1966 | Rohe et al. | ...................... | 52/704 |
| 3,313,079 A * | 4/1967 | Phelan | ......................... | 52/787.1 |
| 3,339,609 A * | 9/1967 | Cushman | ..................... | 411/82.1 |
| 3,504,723 A * | 4/1970 | Cushman et al. | ............. | 411/82.1 |
| 3,646,981 A * | 3/1972 | Barnes | ............................ | 411/82 |
| 3,771,272 A * | 11/1973 | Mihaly et al. | ................. | 52/787.1 |
| 3,778,957 A * | 12/1973 | Appleberry | ........................ | 52/22 |
| 4,717,301 A * | 1/1988 | Oddenino | ...................... | 411/373 |
| 4,800,643 A * | 1/1989 | Higgins | ........................... | 29/458 |
| 4,812,193 A * | 3/1989 | Gauron | ......................... | 156/293 |
| 4,817,264 A * | 4/1989 | Worthing | ......................... | 29/512 |
| 4,941,785 A * | 7/1990 | Witten | ............................ | 411/82 |
| 4,964,594 A * | 10/1990 | Webb | .............................. | 244/131 |
| 4,973,208 A * | 11/1990 | Gauron | ......................... | 411/82.1 |

(Continued)

FOREIGN PATENT DOCUMENTS

EP          0 780 581 A1 *   6/1997   ................ F16B 5/01
EP          841490 A2        10/2001
GB          1353236 A        5/1974

*Primary Examiner* — Gay Ann Spahn
(74) *Attorney, Agent, or Firm* — Fulwider Patton LLP

(57) ABSTRACT

An insert is configured for anchoring within a cored panel and has a wide flange on one end, a sacrificial cover and threaded pin on its opposite end and a nut captured therein. The panel is prepared by forming a countersunk hole therein and filling or coating such opening with an adhesive. The insert is fitted into the hole such that the flange is positioned against one surface of the panel while the sacrificial cover and threaded pin protrude from the opposite surface. A screw fixture is threaded onto the threaded pin to maintain the insert in place while the adhesive cures. Subsequent removal of the screw fixture and sacrificial cover completes the anchoring process and exposes the nut that is captured within the insert for receipt of an appropriate fastener.

17 Claims, 4 Drawing Sheets

(56) References Cited

U.S. PATENT DOCUMENTS

| | | | |
|---|---|---|---|
| 4,981,735 A * | 1/1991 | Rickson | 428/36.9 |
| 5,082,405 A * | 1/1992 | Witten | 411/82 |
| 5,093,957 A * | 3/1992 | Do | 52/787.1 |
| 5,240,543 A * | 8/1993 | Fetterhoff et al. | 411/82 |
| 5,378,099 A * | 1/1995 | Gauron | 411/82.1 |
| 5,415,510 A * | 5/1995 | Funaki et al. | 411/384 |
| 5,542,777 A * | 8/1996 | Johnson | 403/389 |
| 5,632,582 A * | 5/1997 | Gauron | 411/82.1 |
| 5,716,112 A * | 2/1998 | Staszak | 411/386 |
| 6,135,687 A * | 10/2000 | Leek et al. | 411/10 |
| 6,264,412 B1 * | 7/2001 | Nakamura et al. | 411/352 |
| 6,298,633 B1 * | 10/2001 | McCorkle et al. | 52/787.1 |
| 6,862,863 B2 * | 3/2005 | McCorkle et al. | 52/787.1 |
| 7,195,436 B1 * | 3/2007 | Stephen | 411/82.1 |
| 7,428,802 B2 * | 9/2008 | Fukura et al. | 52/506.05 |
| 2006/0137294 A1 * | 6/2006 | Waits, Jr. et al. | 52/787.1 |
| 2009/0293421 A1 * | 12/2009 | Erickson et al. | 52/787.12 |
| 2010/0086377 A1 | 4/2010 | de Mola | |
| 2013/0223953 A1 * | 8/2013 | Thompson | 411/366.1 |
| 2014/0096363 A1 * | 4/2014 | Khamithar et al. | 29/525.02 |

* cited by examiner

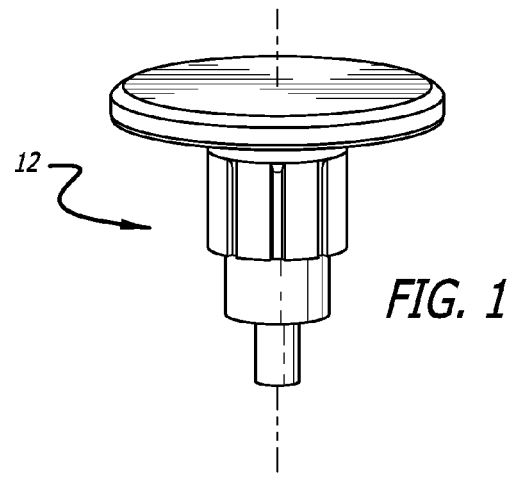
FIG. 1
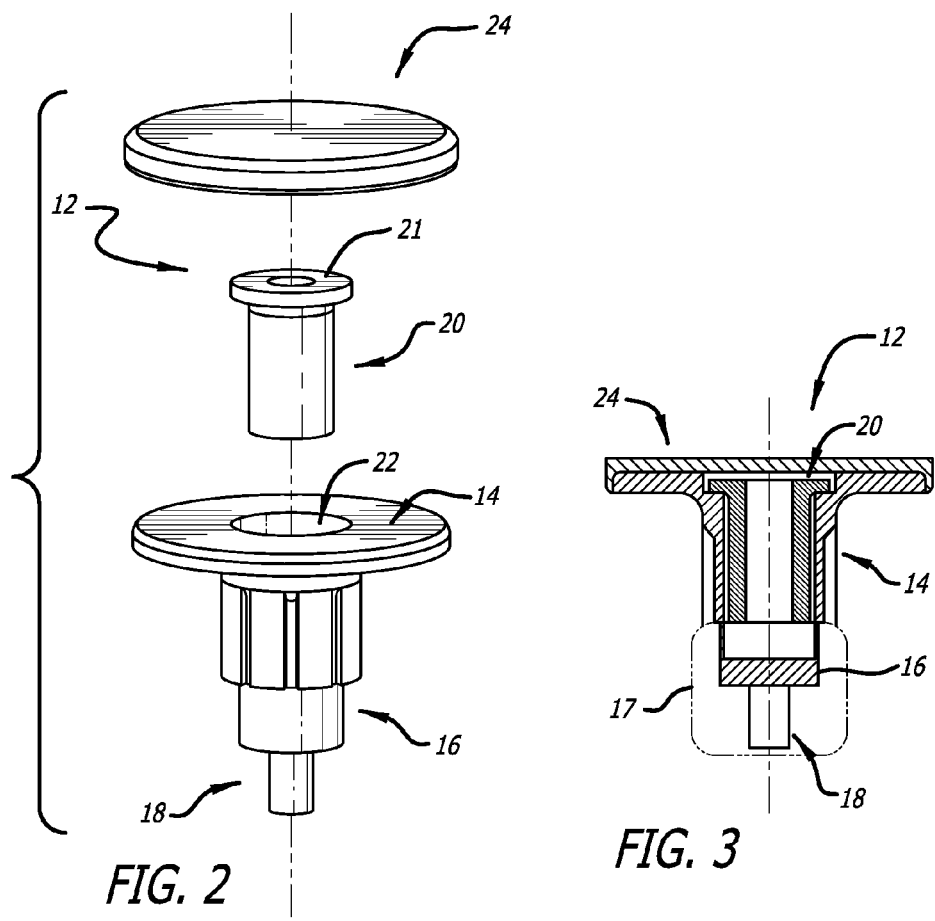
FIG. 2
FIG. 3

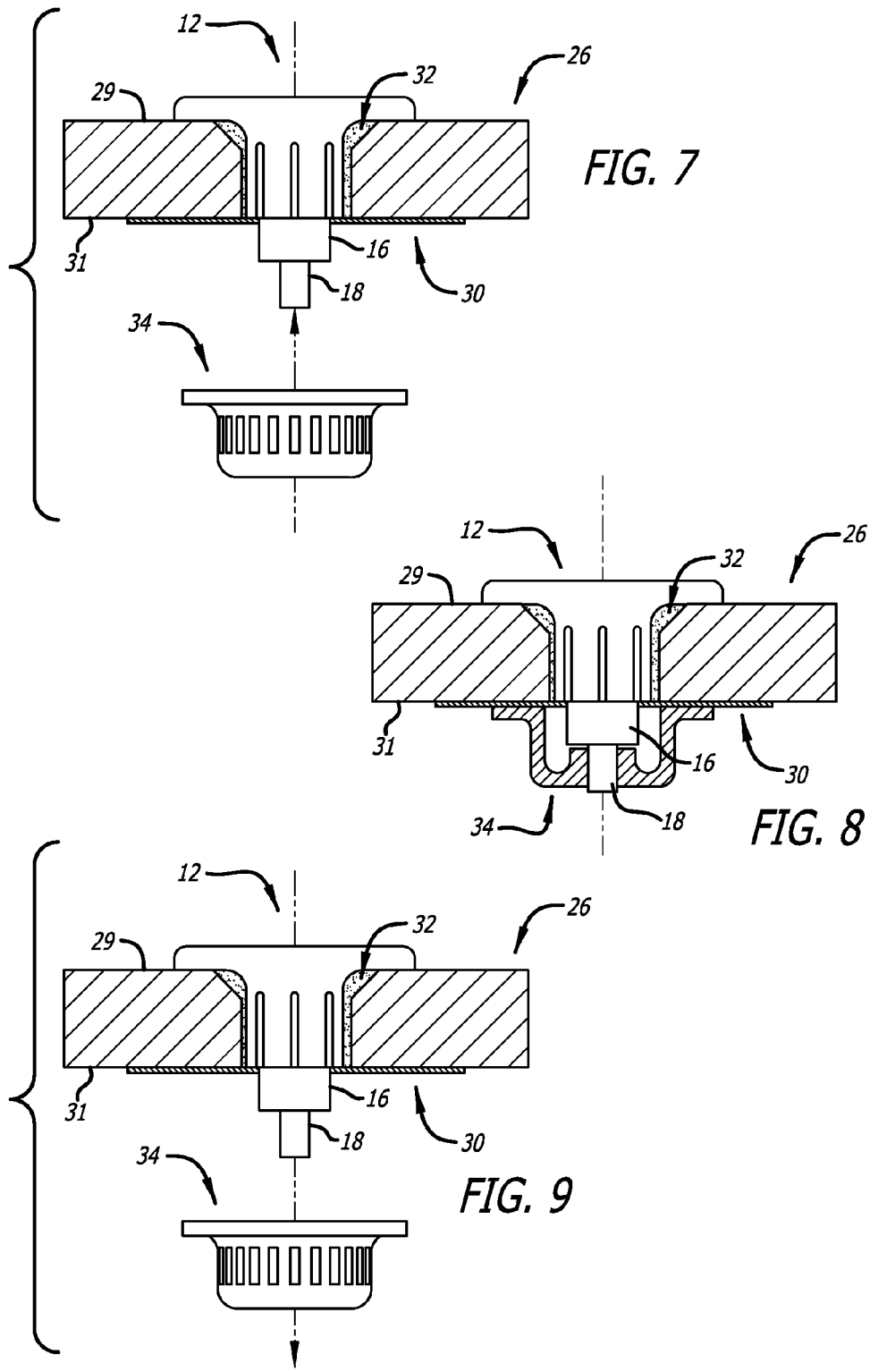

INSERT AND METHOD FOR ANCHORING IN A CORED PANEL

CROSS-REFERENCES TO RELATED APPLICATIONS

This application is based upon and claims priority from U.S. Provisional Application No. 61/758,910, filed Jan. 31, 2013, which is incorporated by reference in its entirety.

FIELD OF THE INVENTION

The invention generally relates to inserts which are anchored in a cored sandwich or composite panel to enable the attachment of various components to the panel. More particularly, the invention provides an improved insert configuration and anchoring method which provides for a more secure attachment and significantly reduces installation time.

BACKGROUND OF THE INVENTION

A variety of structures are provided for storage, entertainment, food service, rest and crew and passenger comfort within the fuselage of a typical commercial passenger carrying aircraft. These structures or "monuments" are constructed of honeycomb cored sandwich or composite panel manufactured from fiberglass skins and a Nomex or Kevlar paper core, or aluminum in most modern aircraft.

In order to provide a means of attaching such items as components, service sub-assemblies or secondary modules to the monument, fixing points are bonded into the structural panel at specific locations as required, these fixing points are commonly known as "inserts". Inserts have heretofore been bonded in sandwich or composite panels by creating wide cavities in the core using hand tools and filling such cavities with adhesive material, which upon curing forms a bond between the insert and the surrounding core and skins. Such cavities are larger in diameter than the diameter of the insert and spread the load over a wider area to provide a greater load carrying capacity than the panel would otherwise be capable of.

An improved insert configuration and attachment method is desirable in order to eliminate the need for large bonding cavities in the panel core, to improve load distribution in the sandwich or composite panel, to reduce the adhesive requirement, to eliminate potential cold bridges, to provide a cleaner process and to significantly reduce manufacturing process times for the installation of the insert.

SUMMARY OF THE INVENTION

The wide flange insert (WFI) of the present invention overcomes shortcomings of previously known insert configurations and methods for anchoring such inserts in cored panels. More particularly, the wide flange insert is intended to eliminate the need for de-coring the panel in order to securely install the fixing point. The wide flange of the invention which rests on one face of the panel is designed to take the load thereby eliminating the need to make wide cavities in the core in which to inject the bonding adhesive around the insert. As a result, significant assembly bonding and curing time savings can be realized, together with reductions in weight and the elimination of a potential cold bridge in a chilled compartment of a refrigerated galley due to the elimination of the adhesive plug surrounding the insert. A new manufacturing process for attaching the insert to the panel comprises an aspect of the invention and uses a cap screw tool to retain the wide flange insert in position during bonding to thereby further reduce the manufacturing process time.

The wide flange insert consists of a metallic or non-metallic bobbin with one surface enlarged to form a rim (the flange) that rests on the surface of the skin on the opposite side of the panel to which the component or sub assembly is to be attached (i.e. the loaded side). Prior to installing the insert a "blind" hole is bored from the reverse skin of the panel to the depth of the opposite skin inner face, using a router or hole saw (the mounting skin). No core is removed from the internal area surrounding the hole, just from the hole itself.

The router or hole saw may have a pilot drill at its center that pierces the mounting skin to accommodate a threaded pin and snap-off spigot or sacrificial cover at the non-flange end of the wide flange insert which allows the attachment of a bonding jig and prevents adhesive from contaminating the threaded metallic nut that is contained within the insert during the bonding process. To bond the wide flange insert to the panel liquid or paste thermosetting adhesive can be used to coat the nose, body and underside of the flange of the insert and/or the hole and surrounding skin on the side on which the flange will rest, the wide flange insert is then inserted into the hole. Alternatively a heat activated or contact adhesive may be used.

The force exerted by the threaded nut is distributed through the rear of wide flange insert, the nut having a spherical or flanged end larger than the through hole of the insert body which allows a degree of "float" to accommodate cases of minor misalignment. Stress loads are partly transferred from the wide flange insert to the skin on which the flange rests, through the adhesive in the routed hole to the core and also to the second skin through contact with the nose.

Accordingly, the present invention provides for a wide flange insert for providing an attachment point for attaching and anchoring a component to a panel. The wide flange insert includes a tubular wide flange body having a tubular shaft portion having a first outer diameter, an inner bore with an inner diameter, first and second ends, an enlarged flange formed at the first end of the tubular wide flange body and having a second outer diameter larger than the first diameter, and a counter bore formed at the first end of the inner bore of the tubular wide flange body. A first end of a generally cylindrical sacrificial cover is connected to the second end of the tubular wide flange body, and a threaded pin is connected to and extends from the second end of the sacrificial cover. A tubular nut is also disposed within the tubular wide flange body, and includes a tubular shaft portion having an outer diameter smaller than the inner diameter of the tubular wide flange body, and an enlarged flange formed at an end of the tubular nut. The tubular nut is disposed within the tubular wide flange body with the enlarged flange of the tubular nut disposed in the counter bore formed at the first end of the inner bore of the tubular wide flange body. A retainer cap configured to retain the tubular nut within the inner bore of the tubular wide flange body is also fixedly attached over the enlarged flange formed at the first end of the tubular wide flange body.

In a presently preferred aspect, the sacrificial cover is integrated into the wide flange insert body. In another presently preferred aspect, the sacrificial cover includes frangible sidewalls. In another presently preferred aspect, the tubular nut may be a floating nut or a non-floating nut.

The present invention also provides for a method of anchoring a wide flange insert in a panel having first and second sides for providing an attachment point for attaching and anchoring a component to the panel. The method includes the steps of drilling a countersunk pilot hole into a first side of the panel, placing a protective sheet over the countersunk hole on an opposing second side of the panel, and filling the countersunk hole with adhesive material. The wide flange insert is pushed into the adhesive filled countersunk hole sufficiently to cause the threaded pin and sacrificial cover to pierce the protective sheet and to cause the insert flange to contact the first side of the panel, an internally threaded fixture is fastened to the threaded pin to secure the wide flange insert in position, and then the adhesive is allowed to cure. The internally threaded fixture is then removed from the threaded pin, and the sacrificial cover and threaded pin are removed from the tubular wide flange body.

In a presently preferred aspect, the panel is a composite panel. In another presently preferred aspect, the sacrificial cover is integrated into the wide flange insert body. In another presently preferred aspect, the step of filling the countersunk hole with adhesive material further includes coating an underside of the flange with adhesive material.

In another presently preferred aspect, the threaded pin is covered with a removable protective sleeve having a piercing point to protect the threaded pin during the step of pushing the wide flange insert into the adhesive filled countersunk hole, and to prevent adhesive contamination of the thread during the step of pushing the wide flange insert into the adhesive filled countersunk hole. In another presently preferred aspect, the protective sleeve on the threaded pin is removed following the step of pushing the wide flange insert into the adhesive filled countersunk hole.

In another presently preferred aspect, the step of removing the sacrificial cover and threaded pin involves breaking off the sacrificial cover and threaded pin, or cutting off the sacrificial cover and threaded pin. In another presently preferred aspect, any residue of adhesive material on the second side of the panel from the second side of the panel is removed following the step of removing the sacrificial cover and threaded pin from the tubular wide flange body. In another presently preferred aspect, any sharp edges resulting from breaking off or cutting off the sacrificial cover and threaded pin are removed.

These and other features and advantages of the present invention will become apparent from the following detailed description of preferred embodiments which, taken in conjunction with the accompanying drawings, illustrate by way of example the principles of the invention.

BRIEF DESCRIPTION OF THE DRAWINGS

FIG. 1 is a perspective view of the wide flange insert of the present invention.

FIG. 2 is an exploded perspective view of the wide flange insert shown in FIG. 1.

FIG. 3 is a cross-sectional side view of the wide flange insert shown in FIG. 1.

FIG. 7 is a cross-sectional side view of the wide flange insert in place within the prepared cored panel prior to the curing step.

FIG. 8 is a cross-sectional side view of the wide flange insert in place within the prepared cored panel during the curing step.

FIG. 9 is a cross-sectional side view of the wide flange insert in place within the prepared cored panel after the curing step has been completed.

DETAILED DESCRIPTION OF THE PREFERRED EMBODIMENTS

Figure 4:
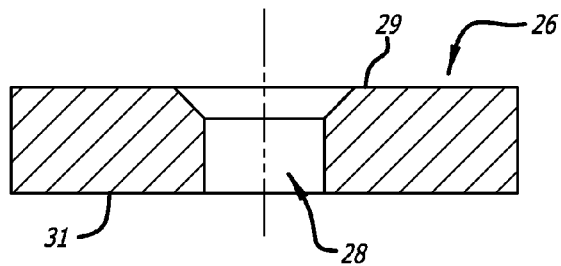
FIG. 4 is a cross-sectional side view of a cored panel in the process of being prepared for receipt of the wide flange insert.

The present invention provides for an improved insert configuration and a method of anchoring such in insert in a cored panel. The insert configuration includes features which facilitate its anchoring in an appropriately prepared panel and features to provide for an improved attachment point for items mounted to the panel via the insert.

The wide flange insert 12 (WFI) of the present invention is shown in a perspective view in FIG. 1, in a slightly enlarged exploded perspective view in FIG. 2 and in a fully assembled cross-sectional view in FIG. 3. The insert includes a wide flange body 14. A sacrificial cover 16 with an integral threaded pin 18 extending therefrom is initially attached to the wide flange body. A ball end or flanged floating or non-floating nut 20 is disposed inside the wide flange insert body with the wide end 21 of the ball end or flanged floating or non-floating nut located and supported in a counter bore hole 22 at the rear of the insert, the nut is retained within the wide flange insert body by a bonded or welded retainer cap 24 integrated into the insert flange itself. The retainer cap may extend across the full width of the flange as illustrated in FIGS. 1-3 or simply of a sufficient dimension to allow for insertion into the wide flange insert body from the rear. The insert may be injection molded from engineering grade plastics or machined from suitable metallic or non-metallic materials.

The sacrificial cover 16 is integrated into the wide flange insert body with a reduced cross sectional area (thin walls) as is visible in FIG. 3 to facilitate post processing removal so as to allow access to the threaded nut. The threaded pin 18 is an integral part of wide flange insert installation process and is used to secure the insert in position during curing using a screw cap tool as shown in FIG. 7.

Figure 5:
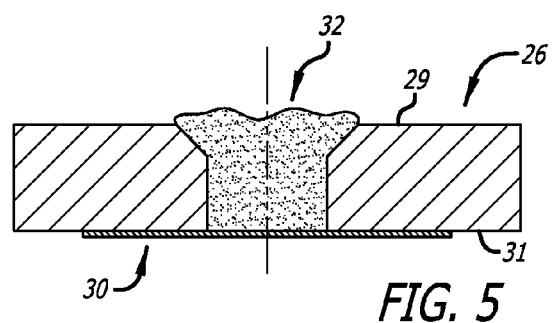
FIG. 5 is a cross-sectional side view of a cored panel further in the process of being prepared for receipt of the wide flange insert.

The present invention additionally provides for a method of installation or anchoring the insert in a composite or sandwich panel 26. A countersunk pilot hole 28 is drilled into a first surface or side 29 of a sandwich or composite panel as shown in FIG. 4. A protective sheet 30 is placed on the opposing second side, face sheet or load side 31 located on the opposing far side of the countersunk hole after which the countersunk hole is filled with adhesive material 32 as is shown in FIG. 5. The underside 33 of the flange may additionally be coated with adhesive.

Figure 6:
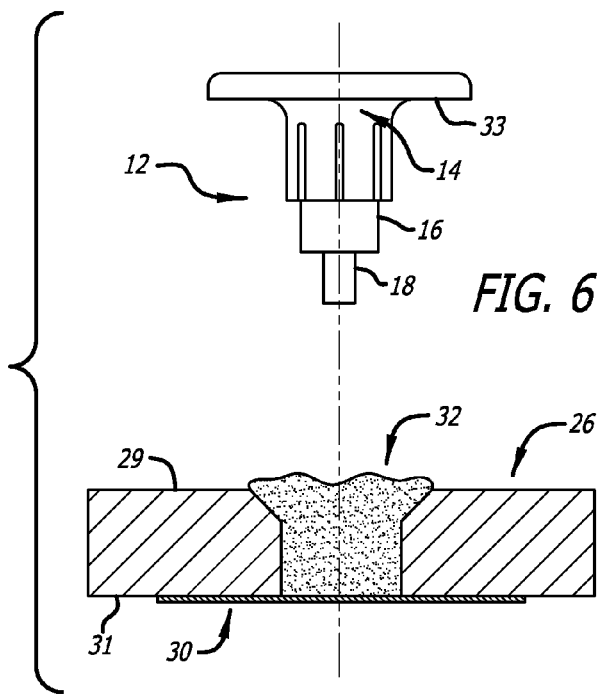
FIG. 6 is a cross-sectional side view of the wide flange insert being inserted into the prepared cored panel.

The subsequent step is shown in FIG. 6, wherein the wide flange insert 12 is pushed into the adhesive-filled or coated blind hole 28 causing the protective sheet 30 to be pierced by the threaded pin 18 and associated sacrificial cover 16 while the flange of the tubular wide flange body 14 comes to rest on the first or inner face 29 of the skin of the sandwich or composite panel 26. The threaded pin 18 is typically protected with a removable protective sleeve 17 (as shown in phantom line in FIG. 3) incorporating a piercing point (not shown) to prevent adhesive contamination of the thread of the threaded pin 18.

Once the wide flange insert 12 is in place in the countersunk hole 28 formed in the composite panel 26, the protective sleeve 17 around the threaded pin 18 is removed, and a screw fixture 34 is fastened to the threaded pin 18 (FIG. 7) to secure the wide flange insert 12 in position while the adhesive material 32 is allowed to cure (FIG. 8). After the adhesive material curing cycle is completed, the screw fixture 34 is unfastened (FIG. 9) and can be re-used for installing another wide flange insert.

Figure 10:
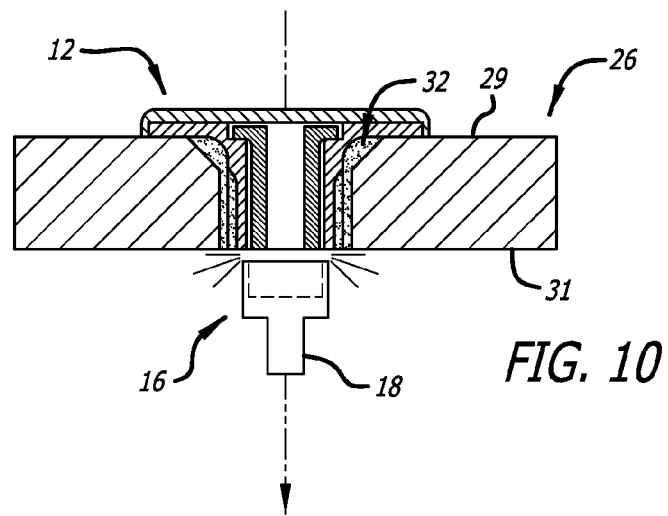
FIG. 10 is a cross-sectional side view of the wide flange insert in place within the cored panel showing the final step in its anchoring process.
Figure 11:
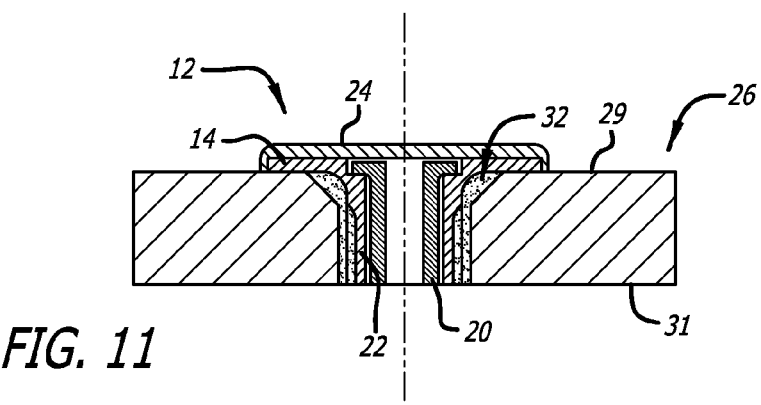
FIG. 11 is a cross-sectional side view of the wide flange insert in place within the prepared cored panel upon completion of the anchoring process.

As illustrated in FIG. 10, the sacrificial cover 16 and threaded pin 18 are then snapped or cut off, and the sandwich or composite panel 26 is dressed and cleaned for which a tool may or may not be used. FIG. 11 illustrates the final stage of the process wherein the counter sunk far side face sheet or load side is cleaned to remove any adhesive residue. Any sharp edges resulted from breaking apart the sacrificial cover are then dressed.

The wide flange insert configuration and method of installation of the present invention eliminates the need for large bonding cavities in the panel core, improves load distribution in the sandwich or composite panel, reduces the adhesive requirement, eliminates potential cold bridges, comprises a cleaner process, and significantly reduces manufacturing process times.

While a particular form of the invention has been illustrated and described, it will be apparent to those skilled in the art that various modifications can be made without departing from the spirit and scope of the invention. More particularly, the wide flange insert and bonding process is applicable to composite panels formed in a variety of dimensions and of a variety of materials and can be applied to a variety of aircraft interior structures including but not limited to galleys, seats, etc. Accordingly, it is not intended that the invention be limited except by the appended claims.

We claim:

1. A wide flange insert for providing an attachment point for attaching and anchoring a component to a panel, comprising:
    a tubular wide flange body including a tubular shaft portion having a first outer diameter, an inner bore with an inner diameter, first and second ends, an enlarged flange formed at the first end of the tubular wide flange body and having a second outer diameter larger than the first diameter, and a counter bore formed at the first end of the inner bore of the tubular wide flange body;
    a generally cylindrical sacrificial cover having first and second ends, the first end of the sacrificial cover being connected to the second end of the tubular wide flange body;
    a threaded pin connected to and extending from the second end of the sacrificial cover;
    a tubular nut including a tubular shaft portion having an outer diameter smaller than the inner diameter of the tubular wide flange body, and an enlarged flange formed at an end of the tubular nut, the tubular nut being disposed within the tubular wide flange body with the enlarged flange of the tubular nut disposed in the counter bore formed at the first end of the inner bore of the tubular wide flange body; and
    a retainer cap fixedly attached over the enlarged flange formed at the first end of the tubular wide flange body, the retainer cap being configured to retain the tubular nut within the inner bore of the tubular wide flange body.

2. The wide flange insert of claim 1, wherein said sacrificial cover is integrated into the tubular wide flange body of the wide flange insert.

3. The wide flange insert of claim 1, wherein said sacrificial cover includes frangible sidewalls.

4. The wide flange insert of claim 1, wherein said tubular nut comprises a floating nut.

5. The wide flange insert of claim 1, wherein said tubular nut comprises a non-floating nut.

6. A method of anchoring a wide flange insert in a panel having first and second sides for providing an attachment point for attaching and anchoring a component to the panel, comprising:
    providing the wide flange insert for providing the attachment point for attaching and anchoring the component to the panel, the wide flange insert including:
        a tubular wide flange body including a tubular shaft portion having a first outer diameter, an inner bore with an inner diameter, first and second ends, an enlarged flange formed at the first end of the tubular wide flange body and having a second outer diameter larger than the first diameter, and a counter bore formed at the first end of the inner bore of the tubular wide flange body;
        a generally cylindrical sacrificial cover having first and second ends, the first end of the sacrificial cover being connected to the second end of the tubular wide flange body;
        a threaded pin connected to and extending from the second end of the sacrificial cover;
        a tubular nut including a tubular shaft portion having an outer diameter smaller than the inner diameter of the tubular wide flange body, and an enlarged flange formed at an end of the tubular nut, the tubular nut being disposed within the tubular wide flange body with the enlarged flange of the tubular nut disposed in the counter bore formed at the first end of the inner bore of the tubular wide flange body; and
        a retainer cap fixedly attached over the enlarged flange formed at the first end of the tubular wide flange body, the retainer cap being configured to retain the tubular nut within the inner bore of the tubular wide flange body;
    drilling a countersunk pilot hole into the first side of the panel;
    placing a protective sheet over the countersunk hole on the second side of the panel;
    filling the countersunk hole with an adhesive material;
    pushing the wide flange insert into the adhesive material filled countersunk hole sufficiently to cause the threaded pin and the sacrificial cover to pierce the protective sheet and to cause the flange of the tubular wide flange body to contact the first side of the panel;
    fastening an internally threaded fixture to the threaded pin to secure the wide flange insert in position;
    allowing the adhesive material to cure;
    removing the internally threaded fixture from the threaded pin; and
    removing the sacrificial cover and the threaded pin from the wide flange insert.

7. The method of claim 6, wherein said panel comprises a composite panel.

8. The method of claim 6, wherein said step of filling the countersunk hole with adhesive material further comprises coating an underside of the flange of the tubular wide flange body with said adhesive material.

9. The method of claim 6, further comprising the step of covering the threaded pin with a removable protective sleeve having a piercing point to protect the threaded pin during the step of pushing the wide flange insert into the adhesive material filled countersunk hole.

10. The method of claim 6, further comprising the step of covering the threaded pin with a removable protective sleeve having a piercing point to prevent adhesive material contamination of the thread of the threaded pin during the step of pushing the wide flange insert into the adhesive material filled countersunk hole.

11. The method of claim 9, further comprising the step of removing the protective sleeve from the threaded pin following the step of pushing the wide flange insert into the adhesive material filled countersunk hole.

12. The method of claim 10, further comprising the step of removing the protective sleeve from the threaded pin following the step of pushing the wide flange insert into the adhesive material filled countersunk hole.

13. The method of claim 6, wherein said step of removing the sacrificial cover and the threaded pin comprises breaking off the sacrificial cover and the threaded pin.

14. The method of claim 6, wherein said step of removing the sacrificial cover and the threaded pin comprises cutting off the sacrificial cover and the threaded pin.

15. The method of claim 6, further comprising the step of removing any residue of said adhesive material on the second side of the panel from the second side of the panel following the step of removing the sacrificial cover and the threaded pin from the wide flange insert.

16. The method of claim 13, further comprising the step of removing any sharp edges resulting from breaking off the sacrificial cover and the threaded pin.

17. The method of claim 14, further comprising the step of removing any sharp edges resulting from cutting off the sacrificial cover and the threaded pin.

* * * * *